(12) United States Patent
Twining et al.

(10) Patent No.: US 8,078,544 B2
(45) Date of Patent: *Dec. 13, 2011

(54) SYSTEM AND METHOD FOR FACILITATING TRANSACTIONS BETWEEN TWO OR MORE PARTIES

(75) Inventors: Ronald Fremont Twining, Dripping Springs, TX (US); John Christopher Hallard, Houston, TX (US)

(73) Assignee: Collaborative Agreements, LLC, Austin, TX (US)

( * ) Notice: Subject to any disclaimer, the term of this patent is extended or adjusted under 35 U.S.C. 154(b) by 459 days.

This patent is subject to a terminal disclaimer.

(21) Appl. No.: 12/254,540

(22) Filed: Oct. 20, 2008

(65) Prior Publication Data

US 2009/0106164 A1    Apr. 23, 2009

Related U.S. Application Data

(63) Continuation of application No. 10/406,151, filed on Apr. 2, 2003, now Pat. No. 7,562,053.

(60) Provisional application No. 60/369,578, filed on Apr. 2, 2002, provisional application No. 60/402,929, filed on Aug. 14, 2002, provisional application No. 60/427,172, filed on Nov. 18, 2002.

(51) Int. Cl.
*G06Q 20/00*    (2006.01)
(52) U.S. Cl. ............... 705/80; 705/64; 705/67; 713/193
(58) Field of Classification Search ................ 705/80, 705/64, 67; 713/193
See application file for complete search history.

(56) References Cited

U.S. PATENT DOCUMENTS

| 6,898,625 | B2 * | 5/2005 | Henry et al. ............. 709/206 |
| 2001/0032189 | A1 | 10/2001 | Powell |
| 2001/0034695 | A1 | 10/2001 | Wilkinson |
| 2001/0056412 | A1 | 12/2001 | Kutsuzawa et al. |
| 2002/0002523 | A1 | 1/2002 | Kossovsky et al. |
| 2002/0004775 | A1 | 1/2002 | Kossovsky et al. |
| 2002/0046187 | A1 | 4/2002 | Vargas et al. |
| 2002/0095311 | A1 | 7/2002 | Donahue |
| 2002/0095368 | A1 | 7/2002 | Tran |
| 2002/0129056 | A1 | 9/2002 | Conant et al. |
| 2002/0138764 | A1 | 9/2002 | Jacobs et al. |
| 2002/0165726 | A1 | 11/2002 | Grundfest |
| 2002/0165730 | A1 | 11/2002 | Matsuda |
| 2005/0240529 | A1 * | 10/2005 | Thomas .................. 705/51 |
| 2007/0219817 | A1 | 9/2007 | Wu |

* cited by examiner

*Primary Examiner* — Pierre E Elisca
(74) *Attorney, Agent, or Firm* — Chalker Flores, LLP; Daniel J. Chalker

(57) ABSTRACT

The present invention provides a system and method for facilitating a transaction between two or more parties. Electronic documents are received from a party and are posted to the secured account such that each party can retrieve and modify the electronic documents. Upon agreement, the electronically signed documents are provided to the parties. The present invention also provides a method for facilitating a proposed transaction between an originating party and a potential buying party using various levels of unrestricted and restricted descriptions of the proposed transaction tied to conditions of release. The requested restricted description is provided to the potential buying party whenever the potential buying party agrees to the one or more conditions of release for the requested restricted description.

24 Claims, 12 Drawing Sheets

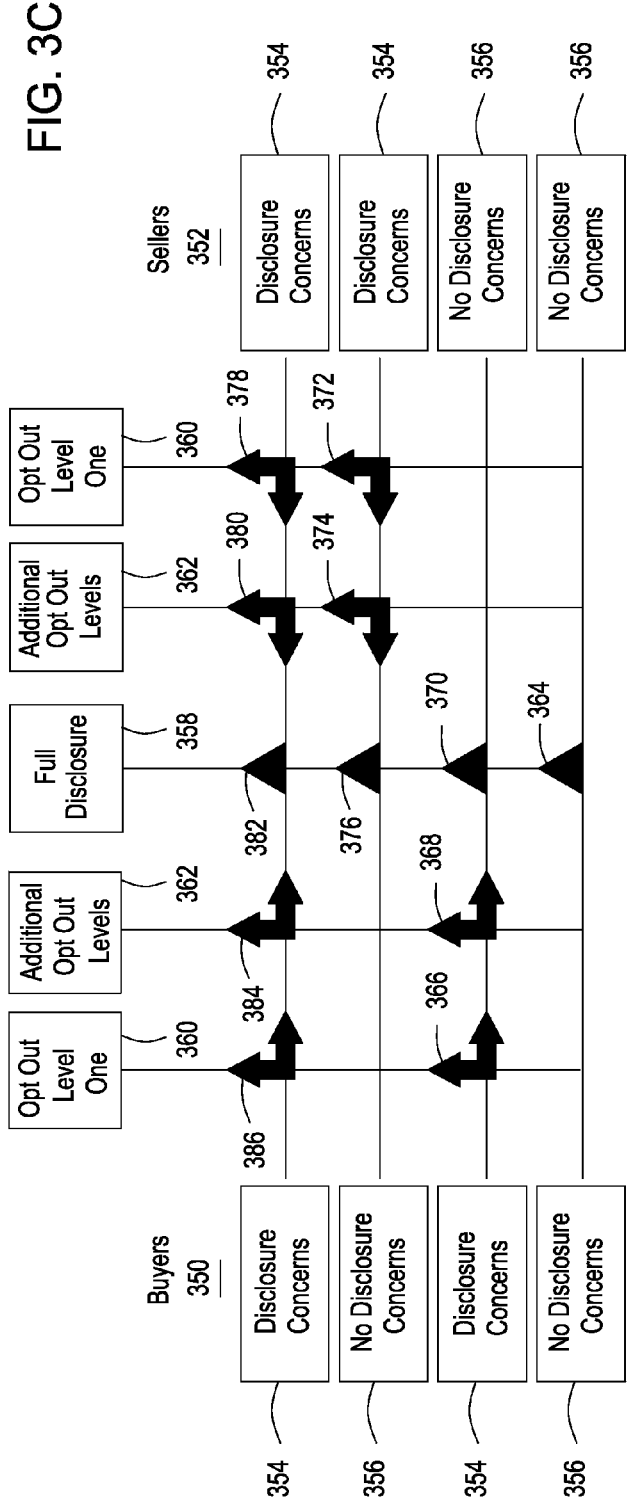

ND METHOD FOR FACILITATING
SYSTEM AND METHOD FOR FACILITATING TRANSACTIONS BETWEEN TWO OR MORE PARTIES

RELATED APPLICATIONS

This continuation application claims priority to U.S. patent application Ser. No. 10/406,151 filed on Apr. 2, 2003 entitled "System and Method for Facilitating Transactions Between Two or More Parties," which issued as U.S. Pat. No. 7,562,053 on Jul. 14, 2009, and is a non-provisional patent application of U.S. Provisional patent applications (a) Ser. No. 60/369,578 filed on Apr. 2, 2002 entitled "Automated method for facilitating transactions between buyers & sellers when there are disclosure concerns of offering IP for sale," (b) Ser. No. 60/402,929 filed on Aug. 14, 2002 entitled "Software for facilitating transactions between buyers and sellers when there are disclosure concerns of offering IP for sale," and (c) Ser. No. 60/427,172 filed on Nov. 18, 2002 entitled "Method of Facilitating Contract Negotiations," all of which are hereby incorporated by reference in their entirety.

TECHNICAL FIELD OF THE INVENTION

The present invention relates in general to the field of computer systems, and more particularly, to a system and method for facilitating transactions between two or more parties.

BACKGROUND OF THE INVENTION

Without limiting the scope of the invention, the background of the invention is described in connection with computer systems for facilitating transactions electronically. Currently, the negotiations process for agreements is cumbersome and time consuming. Agreements must be sent back and forth to parties, suggestions to modifications made, and sent back to the other party for review. Parties must carefully track changes, and when all parties agree, signatures made. Often times, these parties have council, who also must get in the loop. This is time consuming, labor intensive and costly.

Traditionally, sellers of Intellectual Property ("IP"), such as inventions, would enter into some sort of non-disclosure agreement with the potential buyer of the IP. This was done for a variety of reasons, including but not limited to:

"Signed" proof of the exchange of the invention idea having taken place, thusly providing protection to both parties; the inventor, for his or her invention being stolen and for the buyer, not jeopardizing similar R&D projects or inventions that they may be working towards.

The promise of "secrecy" that the buyer entered into with the inventor protected the inventor from violating public disclosure covenants relating to his or her desire to file for a patent in the future.

As the above two scenarios may illustrate, some of the dilemmas in the exchange of the idea or invention seem pretty obvious, but upon further examination, there are subtleties of the exchange that occur during the normal course of skilled business transactions, that if captured in an automated method, could prove to be quite useful and therefore have commercial value. Rather than discuss these subtleties in detail here, they will come out, by example, as the invention is disclosed and those examples are made.

SUMMARY OF THE INVENTION

This invention provides an automated means for sellers of Intellectual Property ("IP") who have disclosure concerns to disclose information relating to the property while maintaining control over the release of this information. This can be done without having to physically be in each others presence. The same protection would be afforded to buyers of property. One such use would be for a seller of IP who wants to disclosure his/her IP to potential buyers without the seller and buyer having to physically be in the same location, while still being able to maintain control over the transaction. When one considers the complicated set of needs of either or both of these parties relating to this transaction, the value for an automated process will become apparent.

The present invention provides many advantages over the prior art, including but not limited to, maintaining legally binding electronic signatures, protecting all types of information, providing for the needs of both the buyer and seller, providing the functional equivalent of a power of attorney, accommodating various layers of information release, allowing for negotiating down to the single letter level, allowing for the use of canned or custom agreements, storing agreements with the user's profile, allowing users to manage signed agreements, providing various agreement distribution options, accommodating more than two parties in a transaction, providing warnings to sellers and providing search functions that search protected information without actually disclosing the information.

More specifically, the present invention provides a method for facilitating a transaction between two or more parties. Registration information is received at a server computer via a network from a client communications device of each party to the transaction. The client communications device may include a computer, a workstation, a personal data assistant, a web-enabled phone or a wireless communications device. The registration information may include a user name for the party, a password for the party and an electronic signature for the party and begins the transaction. A secured account is assigned for the transaction on the server computer that is accessible via the network. Each party is provided with login information for the secured account. One or more electronic documents are received at the server computer from the client communications device of one of the parties. The received electronic documents are posted to the secured account on the server computer such that the client communications device of each party can retrieve and modify the posted electronic documents via the network. One or more changes to the posted electronic documents made by the client communications devices of the parties are tracked. Whenever an acceptance of all portions of one of the posted electronic documents is received by the server computer from the client communications devices of all the parties, the posted electronic document on the server computer is locked against future changes, the electronic signature from each agreed party is attached to the agreed to and locked electronic document and the signed electronic documents are provided to each party. Note that the foregoing method can be implemented as a computer program on a computer readable medium wherein the functions or steps are implemented in one or more code segments.

In addition, the method described above may be implemented in a system that includes a network interface, one or more data storage devices and one or more processors communicably coupled to the network interface and the data storage devices. The system also includes a computer readable medium encoded with a computer program communicably coupled to the processors to (a) receive registration information via the network interface from a client communications device of each party to the transaction wherein (i) the client communications device comprises a computer, a workstation, a personal data assistant, a web-enabled phone or a wireless communications device, and (ii) the registration information comprises a user name for the party, a password for the party and an electronic signature for the party and begins the transaction, (b) assign a secured account for the transaction that is accessible via the network interface, (c) provide each party with login information for the secured account, (d) receive one or more electronic documents via the network interface from the client communications device of one of the parties, (e) post the received electronic documents to the secured account such that the client communications device of each party can retrieve and modify the posted electronic documents via the network interface, (f) track one or more changes to the posted electronic documents made by the client communications devices of the parties, and (g) whenever an acceptance of all portions of one of the posted electronic documents is received from the client communications devices of all the parties via the network interface, the posted electronic document on the server computer is locked against future changes, attach the electronic signature from each agreed party to the agreed to and locked electronic document, and provide the signed electronic documents to each party.

Moreover, the present invention provides a method for facilitating a proposed transaction involving an intellectual property between an originating party and a potential buying party. Acceptance of one or more terms and conditions associated with posting the proposed transaction are received from an origination party. A unrestricted description of the intellectual property is received from the originating party, wherein the intellectual property comprises copyrightable material, ideas, patents, patent applications, trademarks, licenses or technology. One or more restricted descriptions of the intellectual property and one or more conditions of release for each of the restricted descriptions of the intellectual property are received from the originating party. One or more selected operating preferences relating to the disclosure of the one or more restricted descriptions of the intellectual property are received from the originating party. The unrestricted description of the intellectual property is posted on a web site. The disclosure of the one or more restricted descriptions of the intellectual property is automatically negotiated whenever a request for the one or more conditions of release for at least one of the restricted descriptions of the intellectual property is received at a server computer via a network from a client communications device of the potential buying party. The client communications device may include a computer, a workstation, a personal data assistant, a web-enabled phone or a wireless communications device. The client communications device of the potential buying party is provided with the requested one or more conditions of release associated with the restricted description(s) of the intellectual property and any relevant operating preferences of the originating party relating to the requested one or more conditions of release via the network. The requested restricted description(s) are provided to the client communications device of the potential buying party via the network whenever the potential buying party agrees electronically to the one or more conditions of release for the requested restricted description(s). One or more conditions of acceptance for the requested restricted description(s) are received at the server computer via the network whenever the client communications device of the potential buying party requires the originating party to accept the one or more conditions of acceptance prior to disclosure of the requested restricted description(s). The restricted descriptions provided to the client communications device of the potential buying party and the conditions agreed to by the potential buying party and the conditions agreed to by the originating party are all tracked, if any. Note that the foregoing method can be implemented as a computer program on a computer readable medium wherein the functions or steps are implemented in one or more code segments.

In addition, the method described above may be implemented in a system that includes a network interface, one or more data storage devices and one or more processors communicably coupled to the network interface and the data storage devices. The system also includes a computer readable medium encoded with a computer program communicably coupled to the processors to (a) receive acceptance of one or more terms and conditions associated with posting the proposed transaction from an origination party, (b) receive a unrestricted description of the intellectual property from the originating party, wherein the intellectual property comprises copyrightable material, ideas, patents, patent applications, trademarks, licenses or technology, (c) receive one or more restricted descriptions of the intellectual property and one or more conditions of release for each of the restricted descriptions of the intellectual property from the originating party, (d) receive one or more selected operating preferences relating to the disclosure of the one or more restricted descriptions of the intellectual property from the originating party, (e) post the unrestricted description of the intellectual property on a web site, and (f) automatically negotiating the disclosure of the one or more restricted descriptions of the intellectual property whenever a request for the one or more conditions of release for at least one of the restricted descriptions of the intellectual property is received via the network interface from a client communications device of the potential buying party, wherein the client communications device comprises a computer, a workstation, a personal data assistant, a web-enabled phone or a wireless communications device, comprising the steps of: providing the client communications device of the potential buying party with the requested one or more conditions of release associated with the restricted description(s) of the intellectual property and any relevant operating preferences of the originating party relating to the requested one or more conditions of release via the network interface, providing the requested restricted description(s) to the client communications device of the potential buying party via the network interface whenever the potential buying party agrees electronically to the one or more conditions of release for the requested restricted description(s), receiving one or more conditions of acceptance for the requested restricted description(s) via the network interface whenever the client communications device of the potential buying party requires the originating party to accept the one or more conditions of acceptance prior to disclosure of the requested restricted description(s), and electronically tracking the restricted descriptions provided to the client communications device of the potential buying party and the conditions agreed to by the potential buying party and the conditions agreed to by the originating party, if any.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 3C is a flow chart illustrating the layering of restricted descriptions and disclosure conditions in accordance with the present invention;

DETAILED DESCRIPTION OF THE INVENTION

While the production and application of various embodiments of the present invention are discussed in detail below, it should be appreciated that the present invention provides many applicable inventive concepts that may be embodied in a wide variety of specific contexts. The specific embodiments discussed herein are merely illustrative of specific ways to make and use the invention and do not delimit the scope of the invention.

This invention provides an automated means for sellers of Intellectual Property ("IP") who have disclosure concerns to disclose information relating to the property while maintaining control over the release of this information. This can be done without having to physically be in each others presence. The same protection would be afforded to buyers of property. One such use would be for a seller of IP who wants to disclosure his/her IP to potential buyers without the seller and buyer having to physically be in the same location, while still being able to maintain control over the transaction. When one considers the complicated set of needs of either or both of these parties relating to this transaction, the value for an automated process will become apparent.

The present invention provides many advantages over the prior art, including but not limited to, maintaining legally binding electronic signatures, protecting all types of information, providing for the needs of both the buyer and seller, providing the functional equivalent of a power of attorney, accommodating various layers of information release, allowing for negotiating down to the single letter level, allowing for the use of canned or custom agreements, storing agreements with the user's profile, allowing users to manage signed agreements, providing various agreement distribution options, accommodating more than two parties in a transaction, providing warnings to sellers and providing search functions that search protected information without actually disclosing the information.

Figure 1:
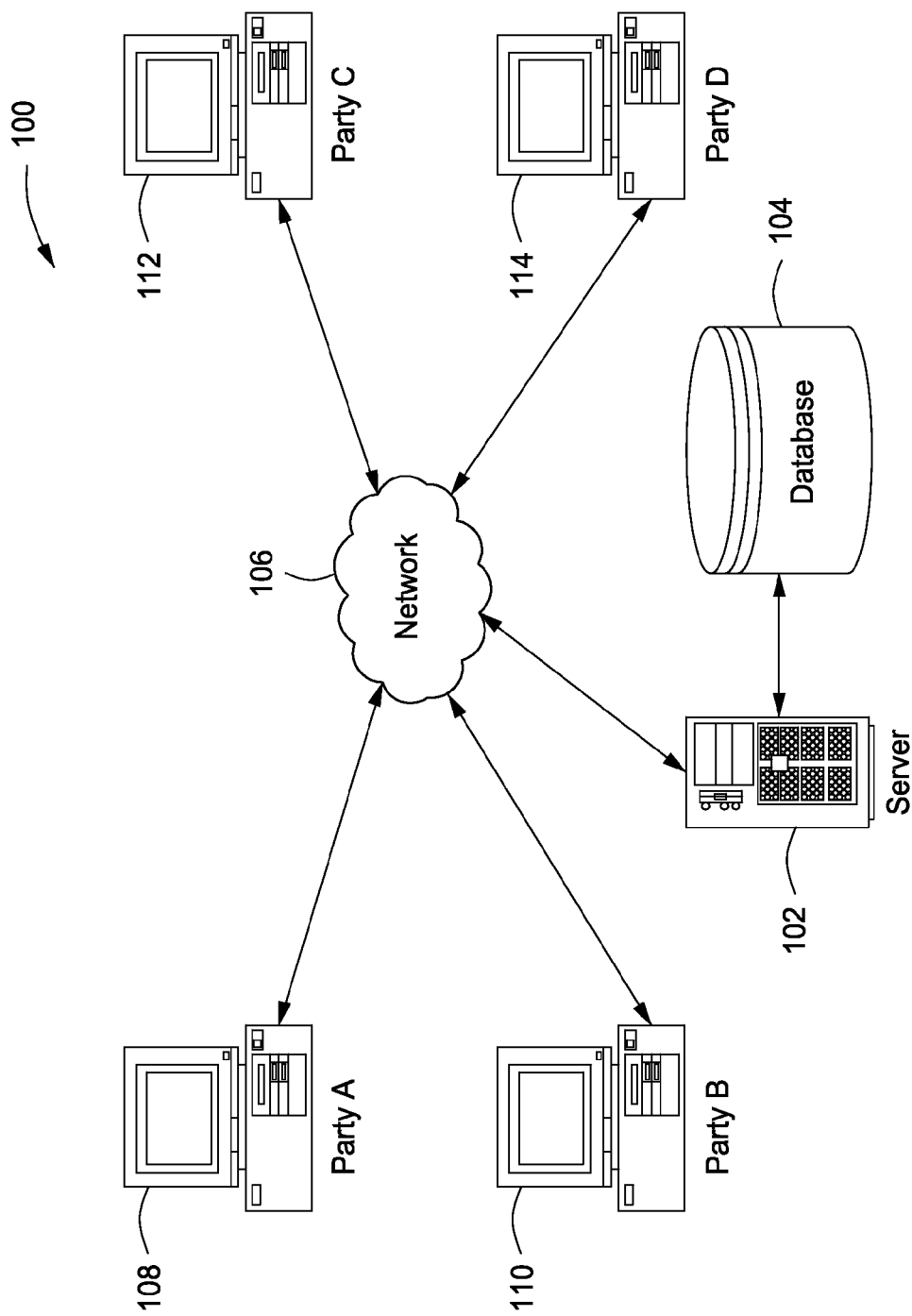
FIG. 1 is a block diagram of a system in accordance with the present invention.

Now referring to FIG. 1, a block diagram of a system 100 in accordance with the present invention is shown. Server 102, which may be one or more processors, computers or other computing devices suitable for implementing the present invention, is communicably coupled to one or more databases 104. The databases 104 may include redundancy/backup capabilities and may be in different geographic locations. The databases 104 can be communicably coupled to the server 102 by direct connections, wireless connections, through other computers or through a local or wide area network, or any other suitable communication connection. The databases 104 store various data, files, profiles, sessions, programs and other information required to operate the present invention. The server 102 is communicably connected to a local or wide area network 106 via a communications interface (not shown). Various persons or entities can access the present invention using a personal computer, laptop computer, workstation, personal data assistant ("PDA"), web-enabled phone or other communications device by connecting to the server 102 via network 106. As shown, four persons or entities Party A, Party B, Party C and Party D are communicably coupled to the network 106 via communication devices 108, 110, 112 and 114, respectively. These Parties A, B, C and D may be using the present invention independently or cooperatively.

Figure 2:
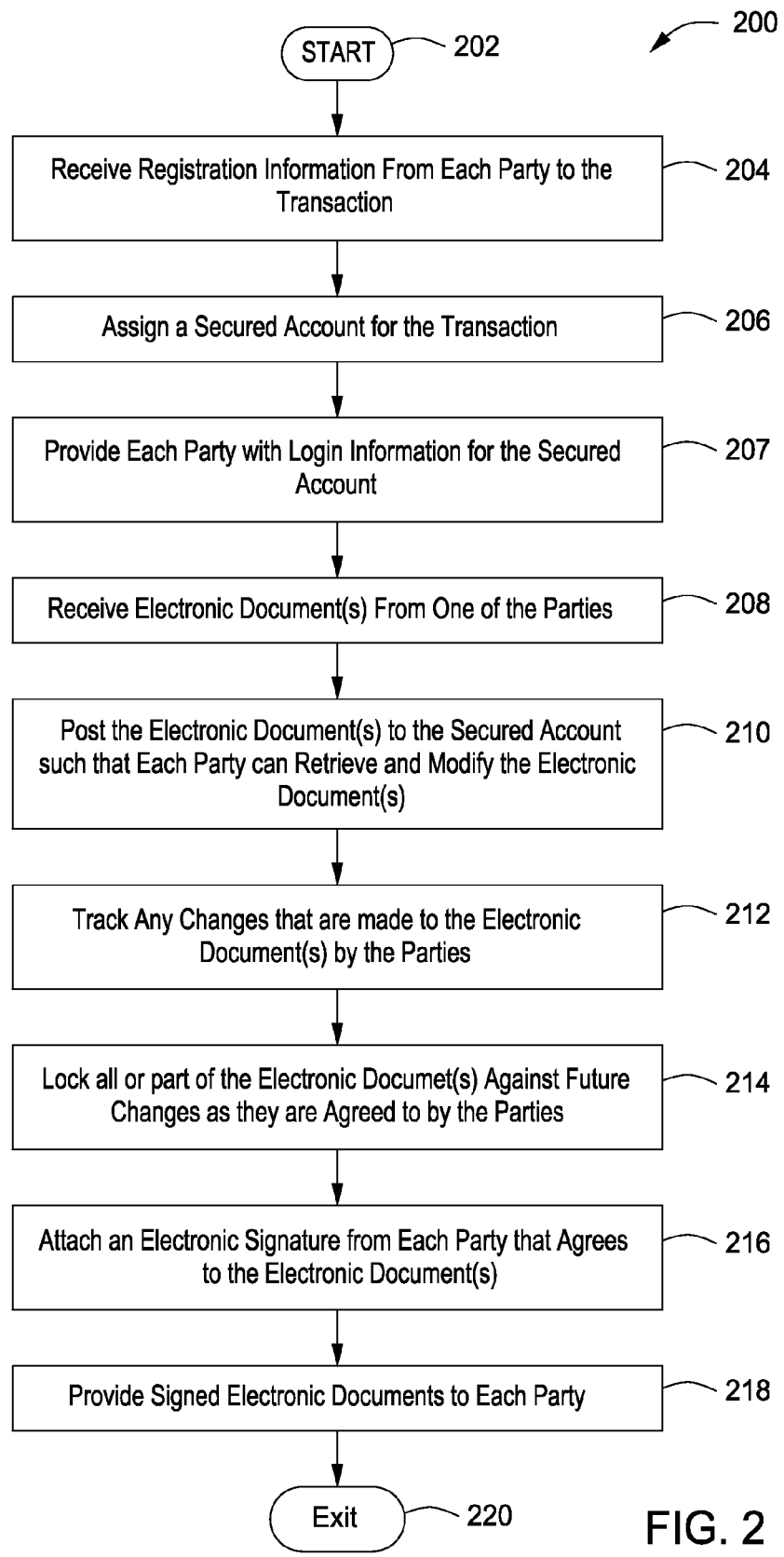
FIG. 2 is a flow chart of a method of facilitating a transaction between two or more parties in accordance with one embodiment of the present invention.

Referring now to FIG. 2, a flow chart of a method of facilitating a transaction between two or more parties 200 in accordance with one embodiment of the present invention is shown. The transaction may involve intellectual property (such as copyrightable material, ideas, patents, patent applications, trademarks, licenses and technology), the sale of goods or services or any other business opportunity in which two or more parties desire to enter into a binding relationship. The process begins in block 202 and registration information is received from each party to the transaction in block 204. The registration information may include a user name for the party, a password for the party and acceptance to certain contractual terms and conditions that create a legally binding electronic signature for the party. Other typical contact information and identity validation information may also be requested or required. A secured account is then assigned for the transaction in block 206. The secured account allows the parties to negotiate the deal, communicate and retrieve and post electronic documents in a secure environment. As a result, each party is provided with login information for the secured account in block 207, which may be in addition to login information required for entry in certain parts of the web site. The login information will typically include a unique user name and password assigned by the system. The party may change the user name and password at a later time as long as certain security criteria are satisfied.

At some time later, the system receives one or more electronic documents from one of the parties that will be used as a starting point for the transaction in block 208. These electronic documents may include a confidentiality agreement, term sheet, purchase agreement, asset purchase agreement, development agreement, license agreement or any other type of document relating to the transaction. The electronic document(s) are then posted to the secured account such that each party can retrieve and modify the one or more electronic documents in block 210. The one or more electronic documents may be selected by the party from a list of standard agreements made available to the party, uploaded by the party or stored in a user profile assigned to the party. Moreover, the posting party may lock one or more portions of the received documents against future changes.

During the negotiation process, the system tracks one or more changes to the electronic documents made by the parties in block 212. The system also locks all or part of the electronic documents against future changes as they are agreed upon by the parties in block 214. An electronic signature from each party that agrees to the electronic document is attached to the electronic document in block 216. Thereafter, signed electronic documents are provided to each party in block 218 and the process is completed in block 220. The system may also provide a dialog session that is public to all the parties for recording comments relating to the one or more electronic documents and/or a dialog session that is private between at least two of the parties for recording comments to the one or more electronic documents. Moreover, the tracking changes function may include receiving one or more commands relating to a portion of the electronic documents from the parties, wherein the one or more commands include an acceptance of the portion of the electronic documents, a rejection of the portion of the electronic documents, a modification of the portion of the electronic documents, or a substitution of the portion of the electronic documents. The acceptances, the rejections, the modifications and the substitutions may also be displayed to the parties in a different visual format. Note that the foregoing method can be implemented as a computer program on a computer readable medium wherein the functions or steps are implemented in one or more code segments.

In addition, the method described above may be implemented in a system that includes a network interface, one or more data storage devices and one or more processors communicably coupled to the network interface and the data storage devices. The system also includes a computer readable medium communicably coupled to the processors to receive registration information from each party to the transaction, assign a secured account for the transaction, provide each party with login information for the secured account, receive one or more electronic documents from one of the parties, post the one or more electronic documents to the secured account such that each party can retrieve and modify the one or more electronic documents, track one or more changes to the electronic documents made by the parties, lock all or part of the electronic documents against future changes as they are agreed upon by the parties, attach an electronic signature from each party that agrees to the electronic document, and provide signed electronic documents to each party.

Figure 3A:
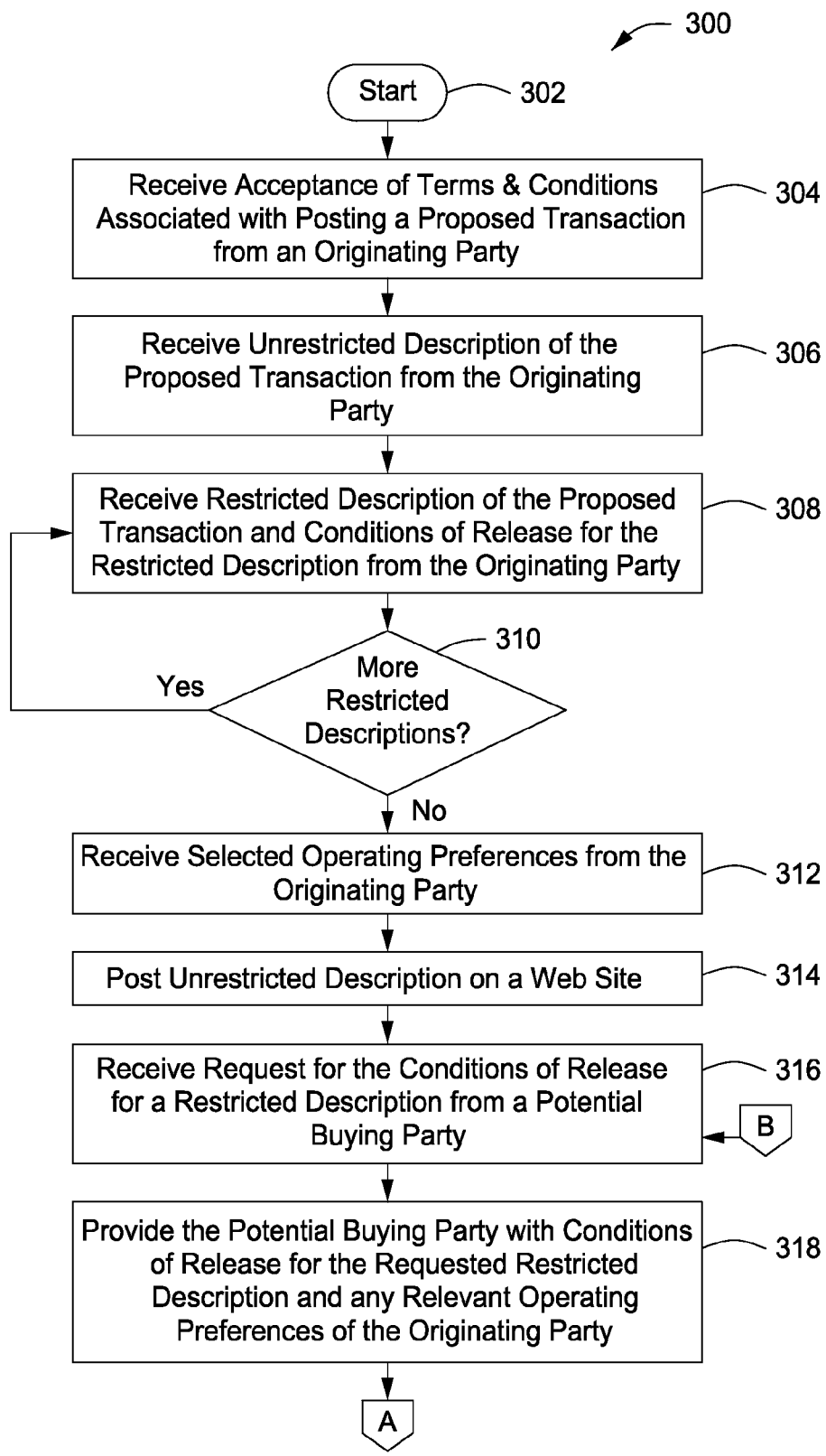
FIGS. 3A and 3B are flow charts of a method of facilitating a transaction between an originating party and a potential buying party in accordance with another embodiment of the present invention.
Figure 3B:
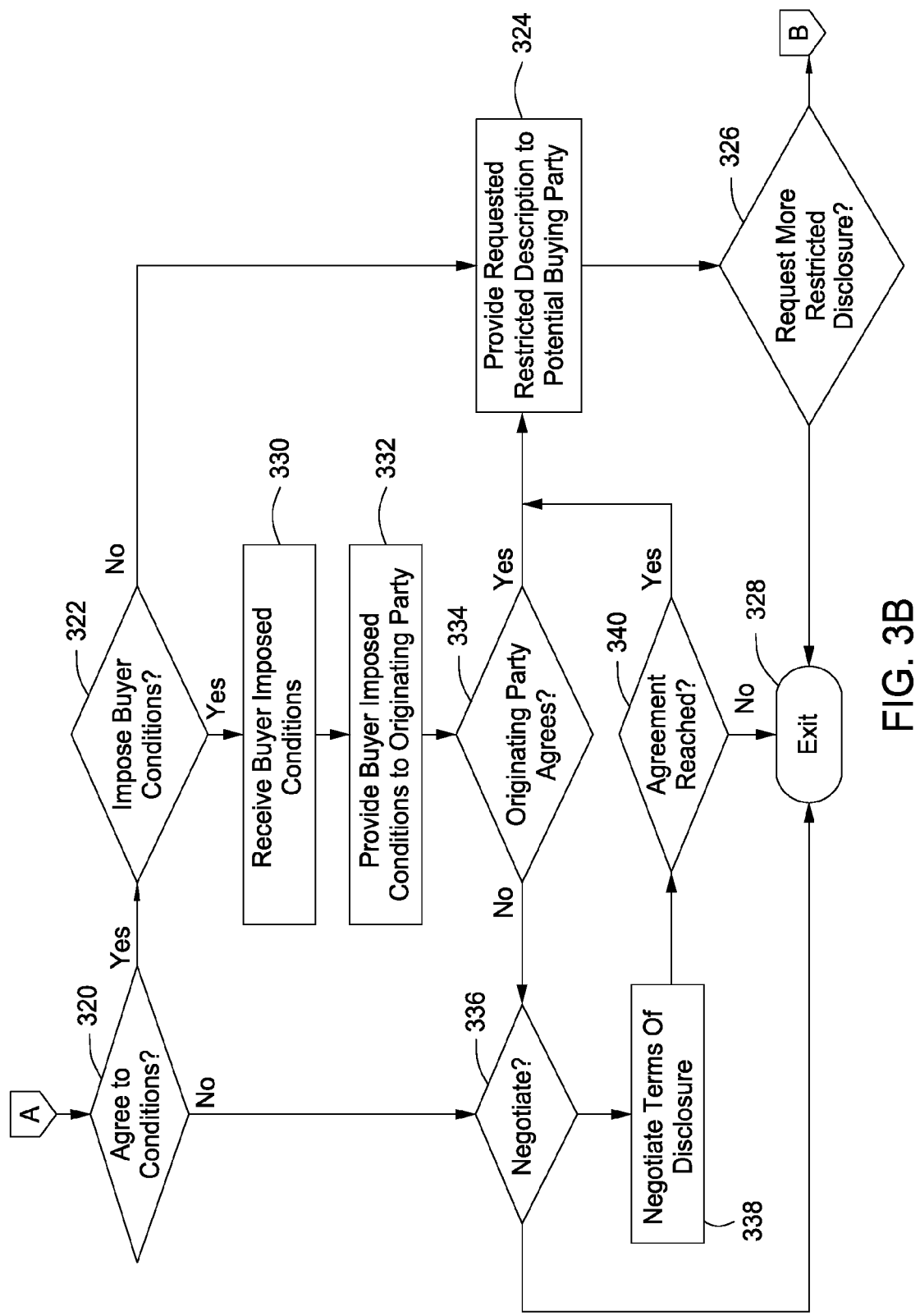

Now referring to FIGS. 3A and 3B, flow charts of a method of facilitating a transaction between an originating party and a potential buying party 300 in accordance with another embodiment of the present invention are shown. The method begins in block 302 and the system receives acceptance of one or more terms and conditions associated with posting the proposed transaction from an originating party in block 304. The one or more terms and conditions create a legally binding electronic signature for the originating party. The transaction may involve intellectual property (such as copyrightable material, ideas, patents, patent applications, trademarks, licenses and technology), the sale of goods or services or any other business opportunity in which the parties are concerned about the disclosure of confidential or proprietary information. An unrestricted description of the proposed transaction is received from the originating party in block 306. The unrestricted description is typically a brief abstract that provides general non-disclosing information about the proposed transaction. One or more restricted descriptions of the proposed transaction and one or more conditions of release for each of the restricted descriptions are received from the originating party in block 308. Each restricted description is tailored by the originating party to provide additional detail about the proposed transaction that is commensurate with the one or more conditions of release for the restricted description. In addition, the restricted descriptions may include graphical content, audio content, video content or any combination thereof. The one or more conditions of release are set by the originating party according to his or her perceived importance of the restricted descriptions. As a result, the one or more conditions may include an acknowledgment of receipt, payment of a fee, a convent not to use, or a confidentiality agreement, which may be supplied by the originating party or a standard agreement that is accessible on the web site. If there is more than one restricted description, as determined in decision block 310, the system continues to receive additional restricted descriptions and conditions of release in block 308. If, however, there are no more restricted descriptions, as determined in decision block 310, one or more selected operating preferences are received from the originating party in block 312 and the unrestricted description of the proposed transaction is posted on a web site or otherwise made available to others. The selected operating preferences may include an automatic notification function, an automated proxy, a final approval before release function, etc.

Thereafter, a request for the one or more conditions of release for one of the restricted descriptions is received from the potential buying party in block 316, and the requested one or more conditions of release and any relevant operating preferences of the originating party are provided to the potential buying party in block 318. If the potential buying party agrees to the one or more conditions of release for the requested restricted description, as determined in decision block 320, and the potential buying party does not want to impose any buyer conditions on the release, as determined in decision block 322, the requested restricted description is disclosed to the potential buying party in block 324. If no more restricted disclosures are requested, as determined in decision block 326, the process ends in block 328. If, however, more restricted disclosures are requested, as determined in decision block 328, the process returns to block 316 and the process continues. If, however, the potential buying party agrees to the one or more conditions of release for the requested restricted description, as determined in decision block 320, but the potential buying party does want to impose any buyer conditions on the release, as determined in decision block 322, the buyer imposed conditions are received in block 330. The buyer imposed conditions are then provided to the originating party in block 332. The buyer imposed conditions may include the originating party's agreement to a waiver, confidentiality agreement, etc. If the originating party agrees to the buyer imposed conditions, as determined in decision block 334, the requested restricted description is disclosed to the potential buying party in block 324. If, however, the potential buying party does not agree to the conditions for release, as determined in decision block 320, or the originating party does not agree to the buyer imposed conditions, as determined in decision block 334, the parties may attempt to negotiate the release of the information. If the parties do not want to negotiate the terms of disclosure, as determined in decision block 336, the process ends in block 328. If, however, the parties do wish to negotiation the terms of disclosure, as determined in decision block 335, the terms are negotiated in block 338. This negotiation process can use the process described in FIG. 2. If an agreement is reached, as determined in decision block 340, the requested restricted description is provided to the potential buying party in block 324. If, however, an agreement is not reached, as determined in decision block 340, the process ends in block 328. As will be appreciated by those skilled in the art, the present invention described above protects both the originating party and the potential buying party to the extent required by the parties. Throughout this process, the system tracks the restricted descriptions provided to the potential buying party and the conditions agreed to by the potential buying party and the originating party.

Note that the negotiation of the disclosure of the one or more restricted descriptions for the origination party can be automatically performed based on the one or more conditions of release. Moreover, the potential buying party may search the restricted disclosure(s) for one or more search terms provided by the potential buying party without agreeing to the one or more conditions of release. The potential buying party is then provided with any unrestricted descriptions that correspond to any restricted disclosure that contains the one or more search terms. Note that the foregoing method can be implemented as a computer program on a computer readable medium wherein the functions or steps are implemented in one or more code segments.

In addition, the method described above may be implemented in a system that includes a network interface, one or more data storage devices and one or more processors communicably coupled to the network interface and the data storage devices. The system also includes a computer readable medium communicably coupled to the processors to receive acceptance of one or more terms and conditions associated with posting the proposed transaction from an origination party, receive a unrestricted description of the proposed transaction from the originating party, receive one or more restricted descriptions of the proposed transaction and one or more conditions of release for each of the restricted descriptions from the originating party, receive one or more selected operating preferences from the originating party, post the unrestricted description of the proposed transaction on a web site, receive a request for the one or more conditions of release for one of the restricted descriptions from the potential buying party, provide the potential buying party with the requested one or more conditions of release and any relevant operating preferences of the originating party, provide the requested restricted description to the potential buying party whenever the potential buying party agrees to the one or more conditions of release for the requested restricted description, receive one or more conditions of acceptance for the requested restricted description whenever the potential buying party requires the originating party to accept the one or more conditions of acceptance prior to disclosure of the requested restricted description, and track the restricted descriptions provided to the potential buying party and the conditions agreed to by the potential buying party and the originating party.

FIG. 3C is a flow chart illustrating the layering of restricted descriptions and disclosure conditions in accordance with the present invention. More specifically, FIG. 3C describes a method of facilitating business transactions where buyers and sellers individually choose opt out requirements. Buyers (potential buying parties) 350 and Sellers (originating parties) 352 either have disclosure concerns 354 or have no disclosure concerns 356. As a result of these concerns, the buyers 350 and sellers 352 desire various opt out levels: full disclosure (no opt out) 358, level one opt out 360, or some number of additional opt out levels 362. This is in stark contrast to prior art systems that only address the disclosure concerns of the sellers 352. These systems also only allow for full disclosure or one opt out level based on the desires of the sellers 352. The present invention, however, takes care of the needs of both buyers 350 and sellers 352. As shown in the matrix, full disclosure 358 is always achieved when both the buyer 350 and seller 352 have no disclosure concerns 356 as indicated by triangle 364. If the buyer 350 has disclosure concerns 354, but the seller has no disclosure concerns 356, the buyer 350 may require some transaction (buyer imposed condition) to occur prior to full disclosure 358 as indicated by arrows 366 and 368 and triangle 370. These required transactions will depend upon the opt out level(s) 360, 362 selected by the buyer 350. Conversely, if the seller 352 has disclosure concerns 354, but the buyer has no disclosure concerns 356, the seller 352 may require some transaction (disclosure conditions) to occur prior to full disclosure 358 as indicated by arrows 372, 374 and triangle 376. These required transactions will depend upon the opt out level(s) 360, 362 selected by the seller 352. The final scenario occurs when the both the buyer 350 and the seller 352 have disclosure concerns. As a result, some transaction (disclosure conditions and buyer imposed conditions) will be required prior to full disclosure 358 as indicated by arrows 378, 380, 382, 384 and triangle 386. These required transactions will depend upon the opt out level(s) 360, 362 selected by both the buyer 350 and the seller 352.

Figure 4:
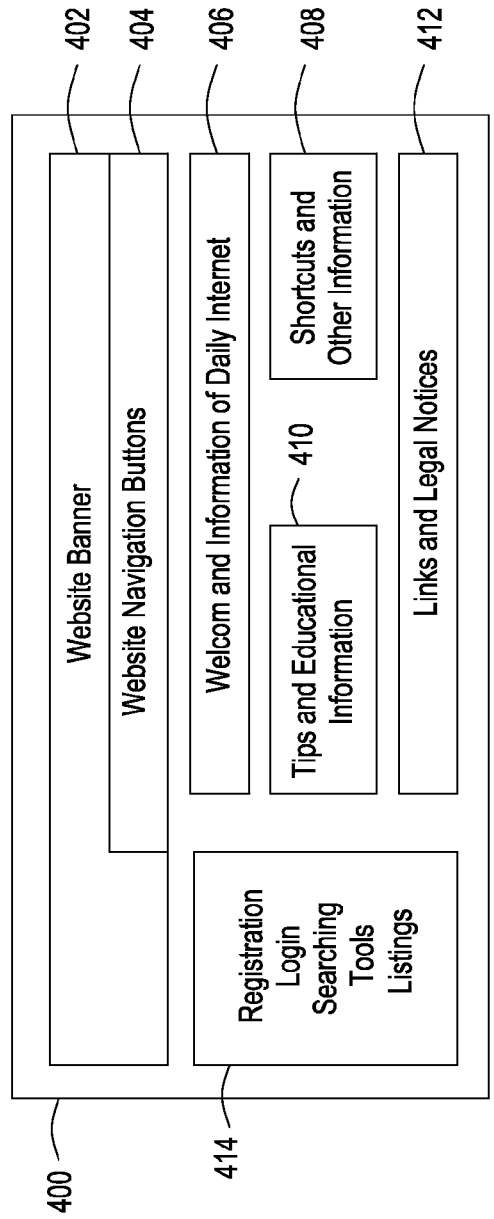
FIG. 4 is a block diagram of a web site page in accordance with one embodiment of the present invention.

Referring now to FIG. 4, a block diagram of a web site page 400 in accordance with one embodiment of the present invention is shown. The web site page 400 includes a website banner 402, various website navigation buttons 404, welcome and information of daily interest section 406, shortcuts and other information section 408, tips and education information section 410, links and legal notices section 412, and a registration, login, searching, tools and listings section. This web site page 400 can be used as the entry screen for a website that provides the services shown in FIG. 2, FIG. 3 or both. FIGS. 5 through 11 illustrate such an example.

Figure 5:
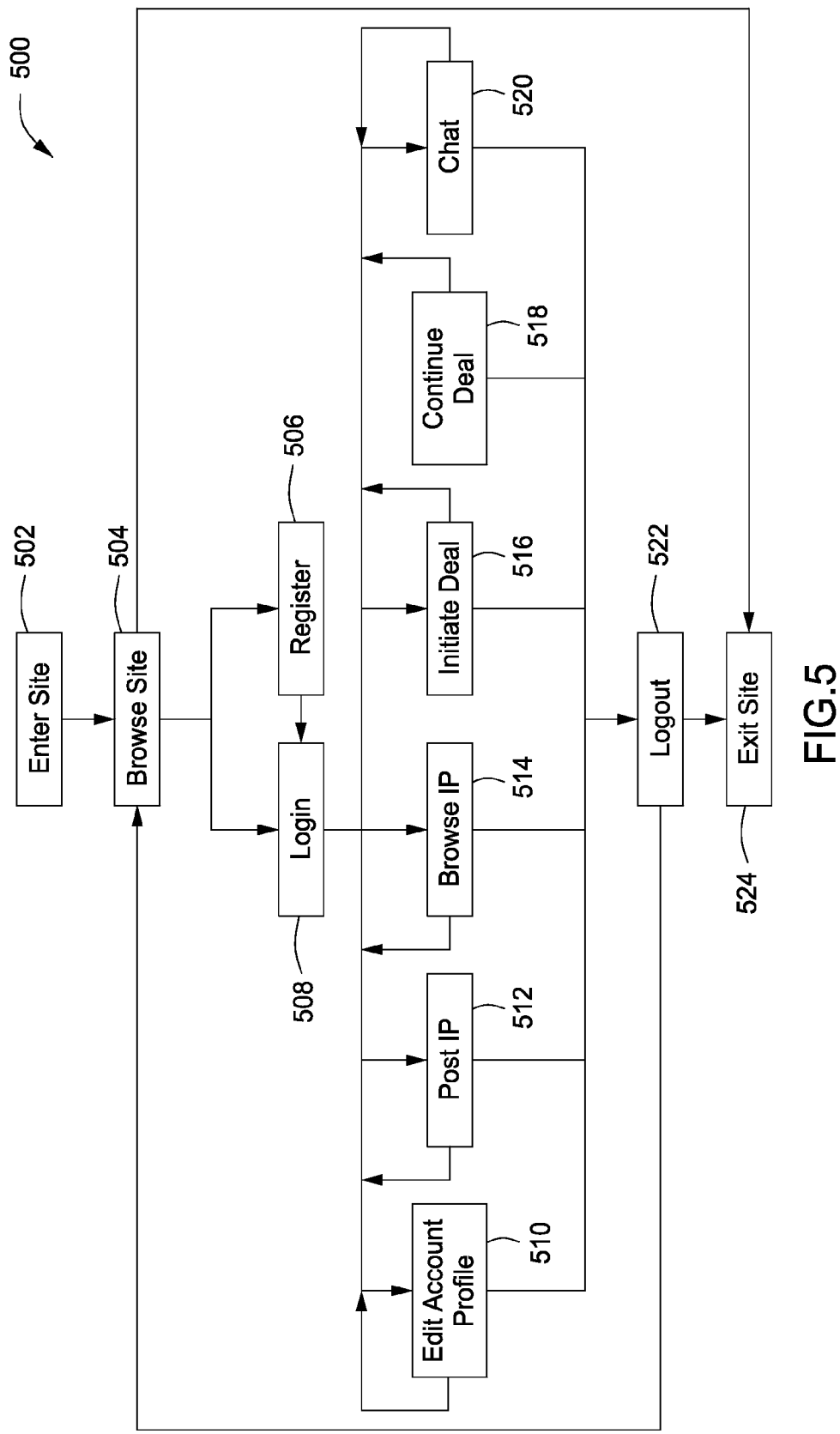
FIG. 5 is a flow chart of a web site in accordance with one embodiment of the present invention.

Now referring to FIG. 5, a flow chart of a web site 500 in accordance with one embodiment of the present invention is shown. The web site is entered in block 502, such that certain public areas of the web site can be browsed in block 504 or exited in block 524. If the user wants access to the private areas of the web site, he or she must become a registered user in block 506 (FIG. 7). Thereafter, the user may login to the web site in block 508. If the login is successful, the user may perform a number of functions 510, 512, 514, 516, 518 or 520. These functions include edit account profile 510 (FIG. 6A), post IP 512 (FIG. 8), browse IP 514 (FIG. 9), initiate deal 516 (FIG. 10), and continue deal 518 (FIG. 11). The user may also logout 522 and/or exit the web site 524. Although, the functions in this example are shown to be private, some of them can be made public.

Figure 6C:
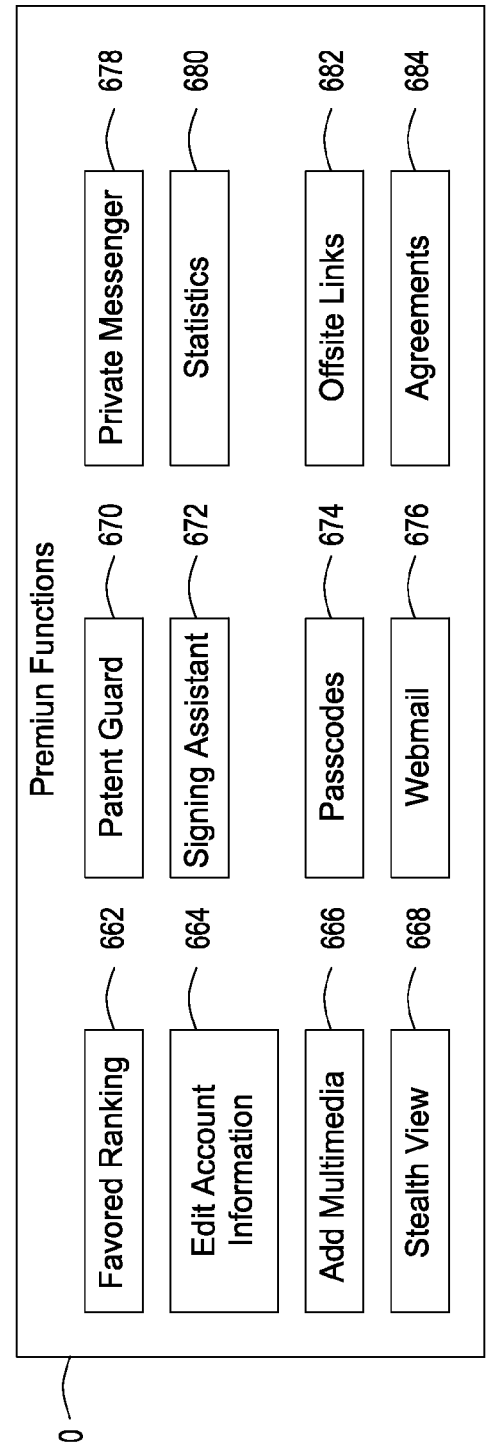
FIGS. 6B and 6C are block diagrams illustrating representative free and premium functions that can be subscribed/unsubscribed to in FIG. 6A in accordance with the present invention.
Figure 6A:
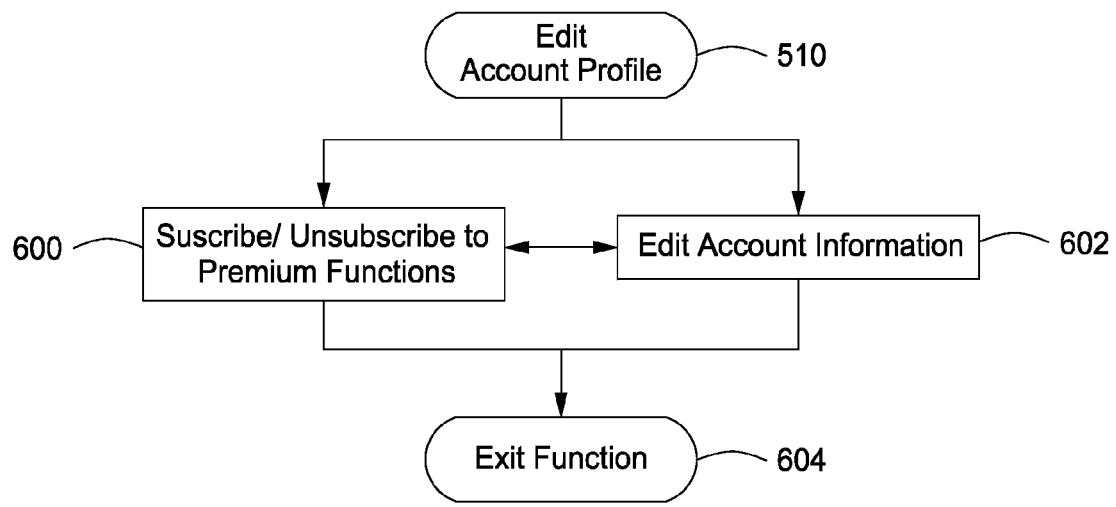
FIG. 6A is a flow chart of the edit account profile function of the web site of FIG. 5 in accordance with the present invention.

Referring now to FIG. 6A, a flow chart of the edit account profile function 510 of the web site of FIG. 5 in accordance with the present invention is shown. The edit account profile 510 allows a user to subscribe/unsubscribe to premium features in block 600, edit account information in block 602 and exit in block 604. The free features 620 are shown in FIG. 6B and the premium features 660 are shown in FIG. 6C.

Figure 6B:
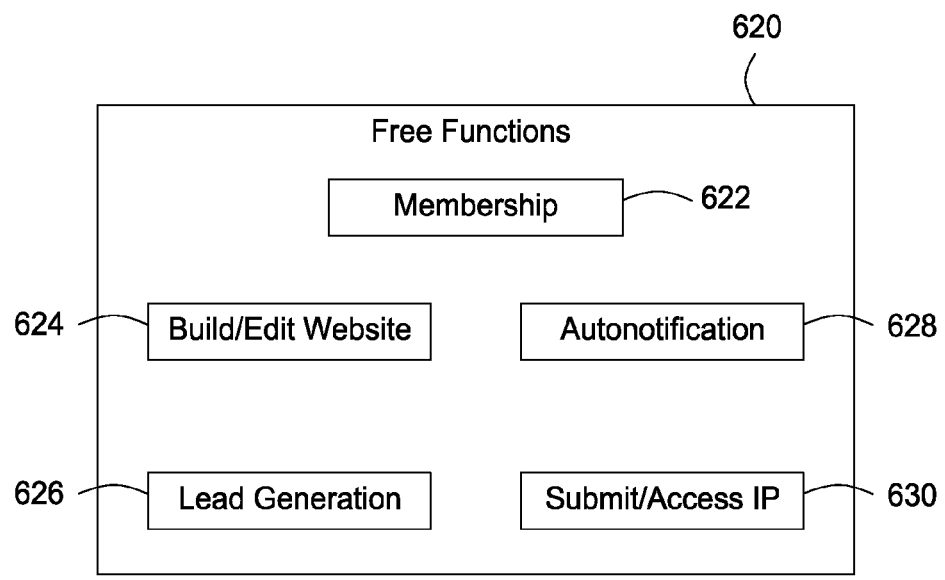
Figure 7:
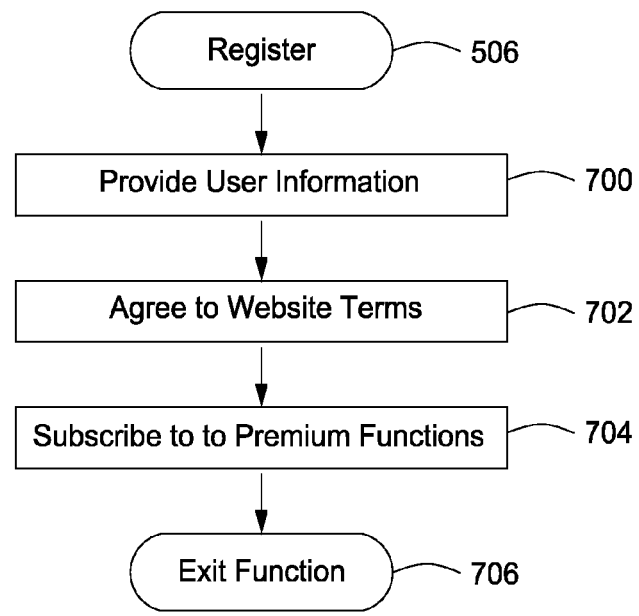
FIG. 7 is a flow chart of the register function of the web site of FIG. 5 in accordance with the present invention.

Now referring to FIGS. 6B and 6C, block diagrams illustrating representative free functions 620 and premium functions 660 that can be subscribed/unsubscribed to in FIG. 6A in accordance with the present invention are shown. The free functions 620 may include membership functions 612, building/editing the user's website 624, lead generation 626, autonotification 628 and submit/access IP 630. The premium functions 660 may include favored rankings 662, edit account information 664, add multimedia 666, stealth view 668, patent guard 670, signing assistant 672, passcodes 674, webmail 676, private messenger 678, statistics 680, offsite links 682 and agreements 684. The autonotification function 628 automatically notifies a user about new web pages being posted into the search engine, by having the system send the user automated e-mail messages, for those invention ideas that match the user's specific detailed search criteria. The autonotification function 628 can also be used to notify a user of various types of disclosure of his or her information to third parties. The patent guard 670 presents legally binding confidentiality agreements or other agreements to a third party before they are allowed to access the details of the user's web site or other information. The signing assistant 672 or proxy agent allows the user to instruct the user's web site or disclosure to automatically sign the user's name, requiring no further action, if the buyer agrees to the user's un-modified terms. The user is also able to keep up with executed copies of the agreements. The passcodes function 674 allows the user to give passcodes to authorized parties so that they can view the user's information. The stealth view function 668 secures the user's web pages from copying the user's content.

Referring now to FIG. 7, a flow chart of the register function 506 of the web site of FIG. 5 in accordance with the present invention is shown. The register function 506 requires the user to provide user information in block 700 and agree to certain website terms in block 702. The user may subscribe to premium features in block 704 and exit in block 706.

Figure 8:
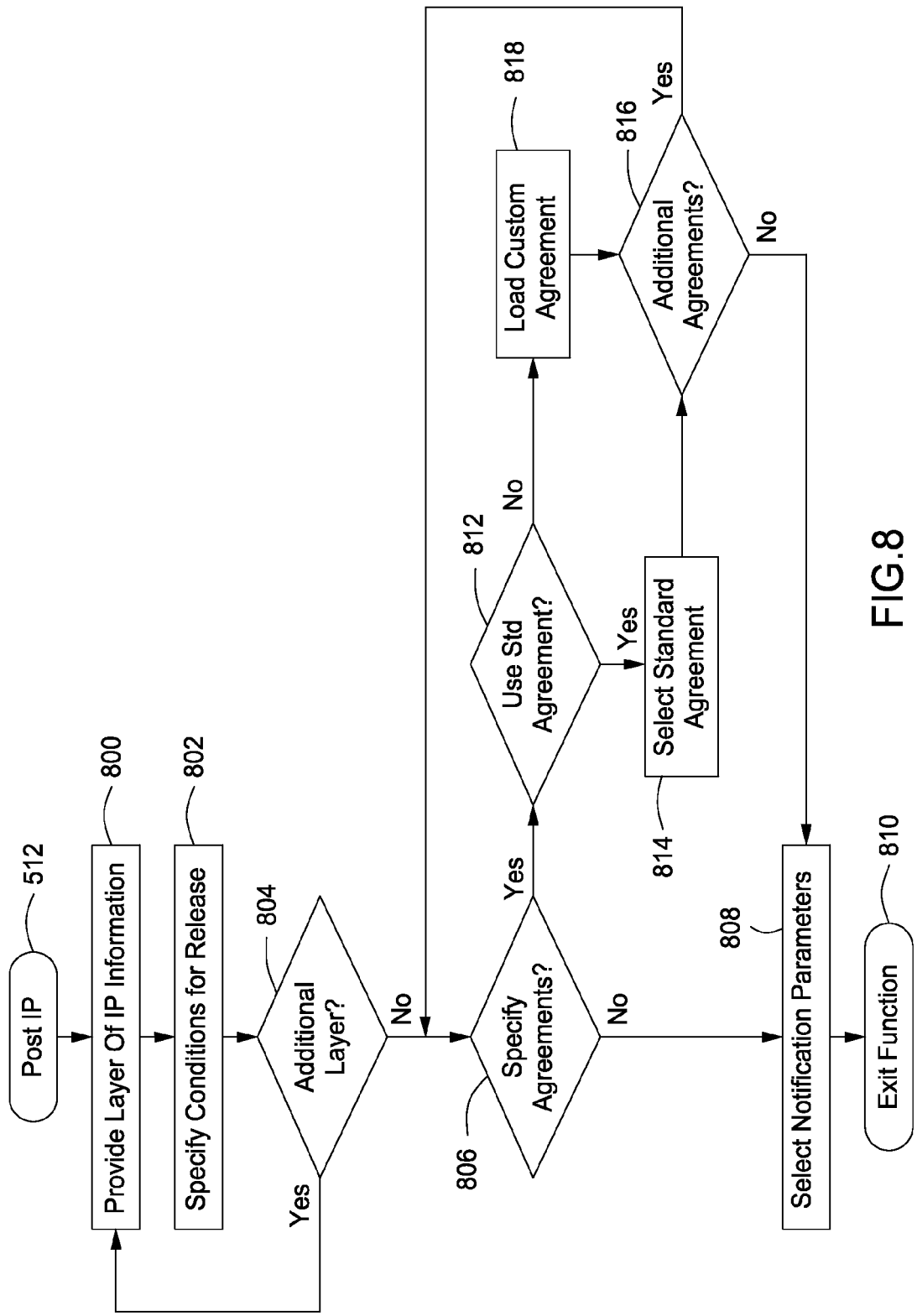
FIG. 8 is a flow chart of the post IP function of the web site of FIG. 5 in accordance with the present invention.

Now referring to FIG. 8, a flow chart of the post IP function 512 of the web site of FIG. 5 in accordance with the present invention is shown. The post IP function 512 allows a user to provide a layer of IP information in block 800 and specify conditions for release of that layer of IP information in block 802. If no conditions are specified, the IP information is considered unrestricted or public information. This process repeats for as many layers of IP information and conditions that the user wants to set up. Once the user has finished providing layers, as determined in decision block 804, the user may specify certain agreements that must be agreed to before various IP information is disclosed. If no agreements are specified, as determined in decision block 806, the user may select various notification parameters in block 808 and exit the function in block 810. If, however, the user wants to specify agreements, as determined in decision block 806, and is willing to use standard agreements, as determined in decision block 812, the user selects a standard agreement in block 814. If, however, the user does not want to use standard agreements, as determined in decision block 812, the user may load custom agreements in block 818. After the standard or custom agreements have been selected in block 814 or 818, additional agreements can be added, as determined in decision block 816, in which case the process loops back to decision block 806. If no additional agreements are required, as determined in decision block 816, the user may select notification parameters in block 808 and exit the function in block 810.

Figure 9:
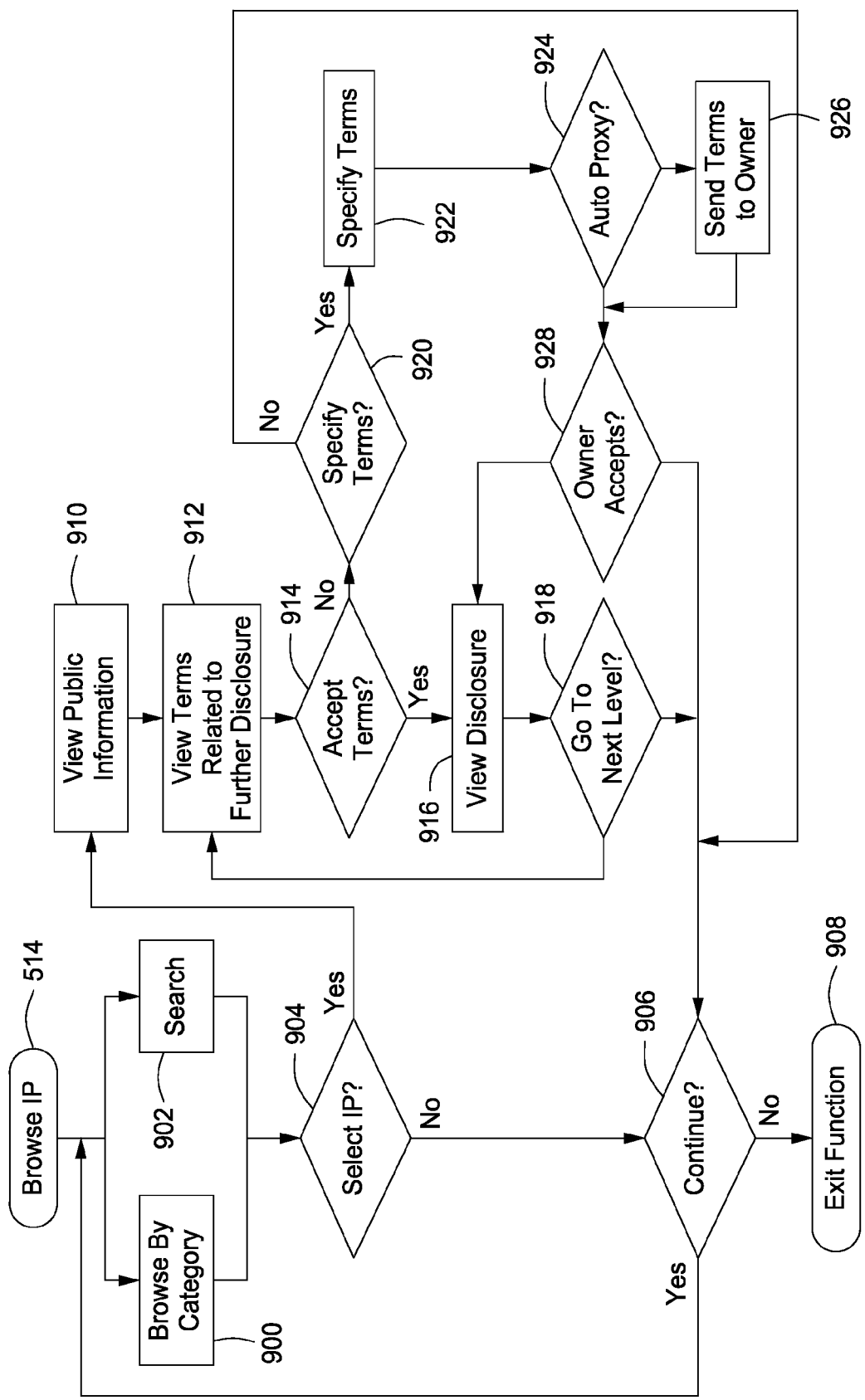
FIG. 9 is a flow chart of the browse IP function of the web site of FIG. 5 in accordance with the present invention.

Referring now to FIG. 9, a flow chart of the browse IP function 514 of the web site of FIG. 5 in accordance with the present invention is shown. The browse IP function 514 allows the user to browse by category in block 900 or search using standard searching methods in block 902. Once either of these methods displays a list of IP, the user may select one of the displayed IP. If the user does not select any IP, as determined in decision block 904, the user may either return to the search 902 or browse 900 functions, or exit the function in block 908, as determined in decision block 906. If the user selects IP, as determined in decision block 904, the user views the public information in block 910 and any terms related to further disclosure in block 912. If the user accepts these terms, as determined in decision block 914, the disclosure is then viewed in block 916. If the user wants to see the next layer of disclosure, as determined in decision block 918, the process returns to block 912 and the process repeats. If, however, the user does not want to go to the next level of disclosure, as determined in decision block 918, the user may either return to the search 902 or browse 900 functions, or exit the function in block 908, as determined in decision block 906. If, however, the user accepts the terms related to further disclosure, as determined in decision block 914, the user may specify his or her own terms. If the user decides not to specify terms, as determined in decision block 920, the user may either return to the search 902 or browse 900 functions, or exit the function in block 908, as determined in decision block 906. If, however, the user does decide to specify terms, as determined in decision block 920, the user specifies those terms in block 922. If the owner has enabled his or her auto proxy, as determined in decision block 924, the auto proxy will decide whether to accept or decline the specified terms based on preset criteria. If the owner has not enabled, his or her auto proxy, the terms are sent to the owner in block 926. If the owner does not accept the terms directly from block 926 or via his or her proxy, as determined in decision block 928, the user may either return to the search 902 or browse 900 functions, or exit the function in block 908, as determined in decision block 906. If, however, the owner does accept the terms directly from block 926 or via his or her proxy, as determined in decision block 928, the disclosure is viewed in block 916, and the process continues as previously described.

Figure 10:
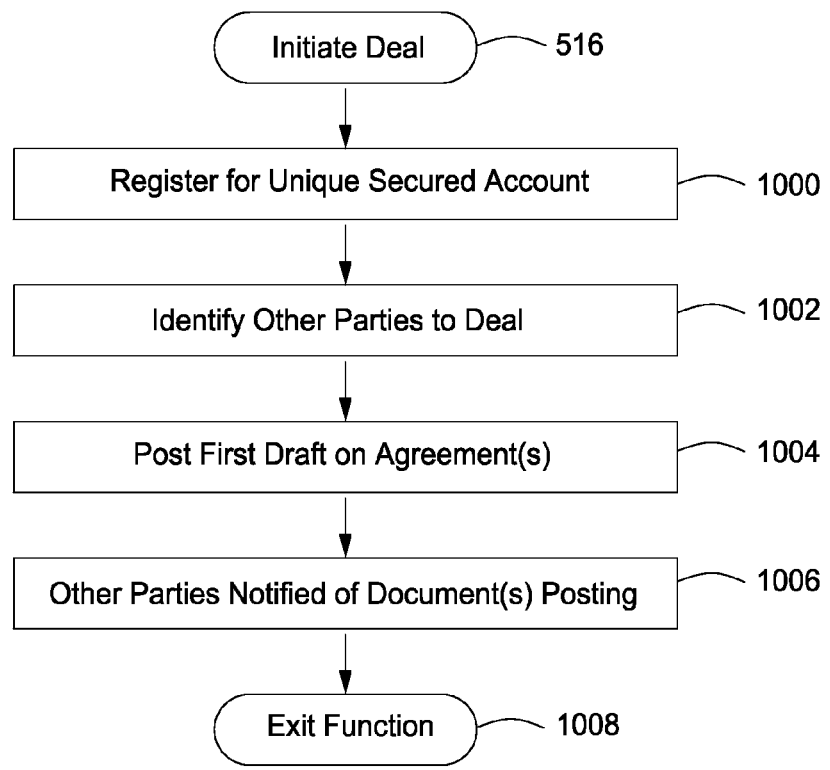
FIG. 10 is a flow chart of the initiate deal function of the web site of FIG. 5 in accordance with the present invention.
Figure 11:
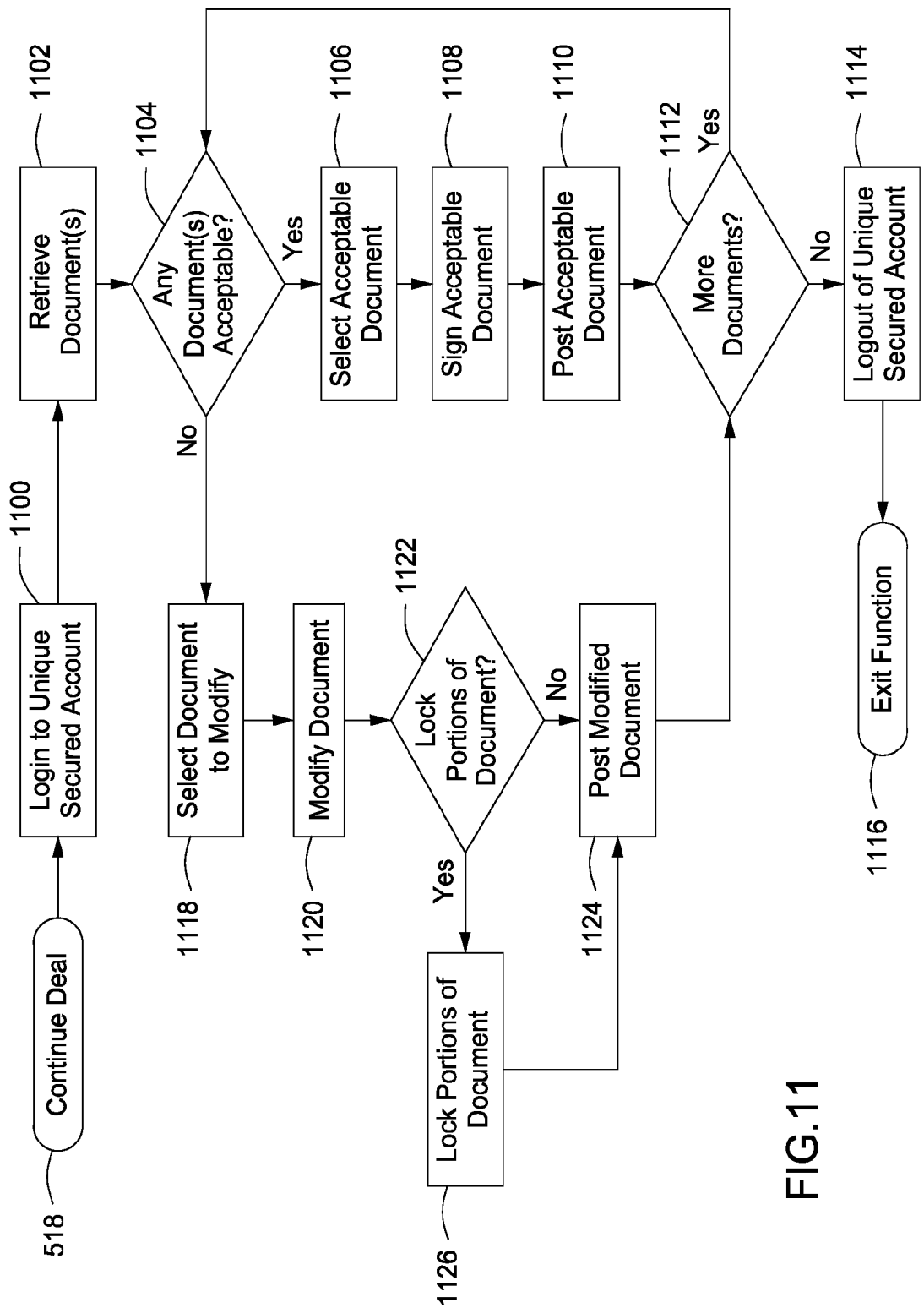
FIG. 11 is a flow chart of the continue deal function of the web site of FIG. 5 in accordance with the present invention.

Now referring to FIG. 10, a flow chart of the initiate deal function 516 of the web site of FIG. 5 in accordance with the present invention is shown. The initiate deal function 516 allows the user to register for a unique secured account in block 1000, identify other parties to the deal in block 1002 and post first drafts of agreements in block 1004. Thereafter, the other parties are notified of the document postings in block 1006 and the function is exited in block 1008.

Referring now to FIG. 11, a flow chart of the continue deal function 518 of the web site of FIG. 5 in accordance with the present invention is shown. The continue deal function 518 allows the user to login to the unique secured account in block 1100 and retrieve any documents in block 1102. If any of the documents are acceptable, as determined in decision block 1104, the acceptable document is selected in 1106, electronically signed in block 1108 and posted in block 1110. If there are any more documents, as determined in decision block 1112, the process loop back to decision block 1104. If there are no more documents, as determined in decision block 1112, the user logs out of the unique secured account in block 1114 and exits the function in block 1116. If, however, there are no acceptable documents, as determined in decision block 1104, the user selects a document to modify in block 1118 and modifies the document in block 1120. The user may then lock portions of the document against any future changes. If the user decides not to lock any portions of the document, as determined in decision block 1122, the modified document is posted in block 1124 and additional documents can be worked with as determined in decision block 1112. If, however, the user does want to lock any portions of the document, as determined in decision block 1122, the user locks the portions of the document in block 1126 and the modified document is posted in block 1124 and the process continues for any additional documents as previously described.

As described above in one embodiment of the present invention, an IP seller posts his/her idea on an online "bulletin board". This electronic bulletin board will allow the IP seller to describe his/her invention, upload photos if he/she has them, and catalogue other traits of the IP that would entice a buyer to license or purchase the IP. The bulletin board will showcase the idea and can facilitate locating a buyer to for the idea. IP sellers and buyer will have to go through an electronic registration process. During registration, both parties may be required to agree to confidentiality contracts that will be electronically signed. Additionally, either or both parties might be required to electronically sign other agreements during different stages of the transaction process.

IP sellers will be able to choose the level of detail regarding their idea that they wish to reveal at any given time. The bulletin board will be able to track the identity of all IP buyers who access a given idea and can forward this information to the IP seller, or store it. The seller can control the release of information however he/she chooses.

The electronic bulletin board will include a WebBot (program) that will act as a virtual agent for both parties. Either party will be able to program the agent to release information tailored to the party's needs and wants. The WebBot will reveal only the information and level of detail about the IP that a seller or buyer would instruct it to reveal. In this embodiment, the WebBot controls the transactional protocols unique to selling and buying of IP automatically, which eliminates the need for traditional in-person meetings between IP buyers and sellers and an agent. In the event that either or both of the parties were to ask for a "human" agent rather than the WebBot, that would be arranged through the bulletin board. Although the disclosed mode of the invention is the posting of patent-related IP for sale on an electronic bulletin board, this bulletin board can assist buyers and sellers of other forms of IP such as copyrighted materials, including manuscripts for books and original works of music.

It should also be noted that the disclosed mode of the invention is an electronic bulletin board that is most likely a network of computers connected via the WWW internet. There are other methods of connecting buyers and sellers contemplated by the inventor, such as by phones of a cellular or satellite system, or by other means electronic or otherwise, not particularly disclosed or currently in general production or use.

The process, if broken down into discreet steps goes as follows.

Step 1. One party drafts a proposed contract or document.

Step 2. The proposed document is sent by some method to the other party or parties. The party in step one may have pre-signed the agreement indicating that if the party or parties in step 2 were to approve the agreement unchanged, that their signature was already in place.

Step 3. If the party or parties in step 2 agreed, they would sign, or they may amend the agreement and return to the originating party on step 1. If altered, clearly the original party would not want the document to be signed without them first reviewing it.

Step 4. This cycle continues until both parties agree, then the document or contract would become binding.

A cycle of steps (2) and (3) may occur and several permutations such as either or both parties wanting their counsel to review the document, the idea of a proxy, or power of attorney signature, and other permutations common to the process.

The present invention provides an electronic means for the parties to simulate the above process, without so much trouble. One such embodiment works as follows:

Step 1. A party logs onto a web site and registers for a unique secured account, then posts a proposed document to the site indicating another user that they intend to negotiate with.

Step 2. The other intended party, also with a unique secured account, "picks-up" the document, and reviews it.

Step 3. They are provided with all of the necessary tools to negotiate the agreement, sign it, forward it, ask questions, etc.

Step 4. Once both parties agree, the system locks the agreement from further change and parties are presented with executed copies for their files.

There are many permutation of this process that would be obvious to someone skilled in such matters. It is not the intention of this filing to exclude improvements to this as is obvious . . . such as the system could store the documents, or that both plain text as well as digital signatures could be used. Also, security is paramount, and the system no doubt would utilize any required procedures to improve performance.

The present invention also provides several possible revenue models, the commercial value of which may be substantial. Client software could be sold, developed plug-in's or a web site operated. One such embodiment of an automated system for facilitating the transaction of IP would be a computing system with a user and a buyer, remotely connected in some manner. For the sakes of this scenario, a system in the form of two personal computers connected to the Internet and a central server managing the transaction is given. However, it should be obvious to those skilled in such things, that the same might be accomplished by means of . . . lets say; two people using touch tones over a telephone system. The same might be accomplished without the need of the central server, and maybe with wireless devices of some sort providing the connectivity between those individuals.

In the disclosed arrangement, two users, one a buyer of IP and one a seller of IP are connected to a central server that acts as a repository for information, and has programs that will interact with that information for the purposed of facilitating the IP transaction between the two parties. For this exercise, Bob, the IP seller has an idea for a very special golf club putter (called oneput) that he wants to sell to someone. A buyer for the sporting goods chain of Gopher (Go4 for short) named Sue, will be looking for inventions as they relate to their sporting goods business. The Web Site that they go to for handling this transaction is called IGF.

Bob goes to the IGF site and sees that they host an invention listings section for inventors to post their ideas in what might be described as an online classifieds for inventions. These classifieds will allow Bob to describe his invention, upload photos if he has them and to catalogue other traits of his idea for a golf putter that he thinks would entice a buyer to license or just outright buy his idea. The site promises to be able to showcase his idea, to potentially locate a buyer for him, and keep in mind all of his special needs as the owner of a unique and valuable idea . . . namely not disclosing his idea in a way that someone can steal it without his knowledge and not disclosing his idea in such a way that it constitutes "public disclosure" as far as the patent office sees it, thereby eliminating his chances for getting a patent that he has applied for issued.

Bob decides to go for it and is prompted to register. During the registration process Bob must affirmatively provide and agree to several items that are ultimately consummated by his "digital signature".

1. Bob would agree to certain terms and conditions that the site operates under, potentially even specific terms and conditions related to him as a seller, such as would be in a traditional NDA.

2. Bob would affirmatively identify himself and provide certain personal information that form time to time could be used to substantially prove that the original registrar was indeed the same person that could access their information in the future. This might be a self chosen username and password, but surely is not limited to this.

3. Bob would choose how he wants his idea "disclosed" or "shown" to potential buyers. The choices are outlined as follows:

a. If Bob were to already have a patent or maybe just be a risk taker, he could choose to allow his idea to be posted with no conditions placed on its accessibility. Anyone coming across Bob's listing by way of searching, browsing or by whatever means, could dive right into the details of Bob's putter idea as he provided in the original listing. This of course may or may not be in Bob's best interest and may or may not be how buyers prefer to look at ideas, but in any case, this was a choice Bob made, and the site would make it possible. In this case, the site software could choose to track or not track those registered buyers who reviewed Bob's idea, could choose to store the information for later retrieval, forward that information to Bob, for instance by way of an e-mail, or do both. Similarly, the site could give these choices to Bob to make, or it could simply happen automatically as a policy of the site and how the program was designed to operate.

b. If Bob were being more prudent, he would choose to take advantage of the sites WebBot IP Agent named Prophet. When Bob listed his idea for the putter, he would choose to invoke the services of Prophet so that several desirable transactional protocols unique to selling and buying IP could be adhered to, automatically, and without the need for traditional meetings have to be arranged for.

4. Prophet is a disinterested third party WebBot agent, who would reveal only that information that a seller or buyer would instruct it to.

5. Bob, when registering to be a seller of his patented putter idea would stage the information that discloses the idea of his putter in such a way as to provide ever increasing levels of disclosure about the exact nature of the idea, ending in complete detailed disclosure of the putter to a potential buyer. Attributes of this idea are ordered and arranged such that Bob can choose how many of these "tidbits" of information a buyer can go through, until they get to the end, where all of the information is disclosed. Prophet would take care of the release of information to any of Bob's potential buyers, and might even store information relating to the disclosure, forward it on to Bob, neither, or both.

6. Now this procedure to release information in "tidbits" may or may not be in Bob's best interest. At first glance, you would assume that it was designed to keep someone from stealing Bob's idea from him without him knowing it. And in principle, it could indeed perform that role. Bob can see that, and likes that part of Prophets role. With this in mind, Bob provides all of the setup required to accommodate this release of information in "tidbits" and hires Prophet to got to work for him.

7. What many inexperienced inventors, like Bob, are unaware of is that companies such as G4 have their own R&D programs that work on inventions all the time. Even if sellers are savvy enough to realize that companies, such as G4, had R&D departments, they may not realize that companies often do not want to jeopardize their R&D programs by "seeing" something in someone else's invention, which might cause the novelty or authorship of their own R&D works to become disputed someday in a court room. To that end, the same "tidbits" disclosure technique that Bob thought was a good idea to keep someone from stealing his idea, turns out to be valuable to G4, because they can opt to not see any further information relating to Bob's putter, once they believe that it may adversely affect some R&D effort that they have underway. Just the same, they may learn that Bob's putter ideas is a great one, does not conflict with ideas that they have underway, and continue requesting the information from Prophet until such time as the Bot has given them everything they needed to see, to fully understand Bob's invention.

9. The degree and timing in which information is disclosed will be a matter of business strategy of the site. It may be determined which situations are optimum, and therefore the Bots function modified to accommodate that. For instance, buyers like G4 may not be comfortable having their actions reported back to Bob, but may be fine understanding that the site's management logs and stores their actions, for the benefit of Bob, should he ever need a written record because he felt his idea was infringed on by someone without the knowledge prior to seeing it in a listing on the web site. In this case, G4 would have improperly benefited by seeing Bob's putter idea, if they did not afford Bob some sort of credit. Furthermore, in the event that Bob had already patented his idea, the function of the Bot might be quite different, since a patent constitutes public teaching of an idea, the Bots function might just serve as that of a notification agent for the buyer.

10. Prophet the WebBot has another very powerful role in his ability to communicate inventions such as Bob's putter, to buyers such as G4. Bots such as Prophet, have the ability to only "tell" about that information which they are asked for, or programmed for. In the case of IP and specifically in that of a buyer of IP such as G4, Prophet the WebBot can once again prove to be very handy.

11. In the case of a buyer who has no worries of being accused of stealing someone's property and no worries of stumbling upon an idea that may compromise something that they are already working on (almost never) they could indeed happily browse through idea after idea, to their hearts content. Only their time would be a limit to how many ideas they could sift through, looking for those they are interested in, and agonizing over all the details makings sure they did not miss anything. Such is seldom the case.

12. When a buyer like G4 registers with IGF, they tell Prophet the WebBot what sort of inventions they are interested in, and could even specify which categories of inventions Prophet should exercise special care when revealing information to them. Buy categories of inventions, it might also be stated as . . . what sorts of ideas are they already pursuing, and where do they need to exercise special care not to jeopardize their already developing invention work.

13. So similar to the way that Bob customized how he wanted Prophet to behave when showing his putter idea to buyers, G4 customizes Prophet to tell them information that will suit their individual business needs as it relates to their desire to pursue new inventions and ideas relate to its business.

14. Prophet, by way of e-mail or some other automatic notification, would send information about ideas, tailored to G4's profile that Prophet would double check before sending. Prophet could either send a link to the information that is stored on the server, which G4's representative would then logon to go review.

15. In one embodiment, the G4 representative, once on the site, might elect to continue asking Prophet for more "tidbits" until such time that they may elect or reject the idea midstream before total disclosure for reasons that they may or may not be required to disclose to Bob. If they chose, they could continue on until having total access to the idea.

16. In another embodiment, Prophet the WebBot could simply prepare the information in a package, and send it to the buyer. The package would contain whatever details that coincided with the desires of the seller, and the buyer once in receipt of the package could request more information, or state that they were not interested in learning anymore. In this scenario, the package could be sent as an e-mail attachment, or Prophet the WebBot could print out the information and it could be mailed or couriered to G4. In the event that neither, either or both of the parties were to ask for a "human" agent rather than Prophet the WebBot be involved, that would surely be arranged for.

This business of providing a method for the controlled disclosure of IP from a seller to a buyer has many opportunities for the operator to glean financial benefit. Much the same way that a human agent might charge for his or her services in bringing together buyer and seller, Prophets owners might profit. A flat fee subscription or possibly even a percentage of royalties might be charged. The charge could be paid for by either the buyer or the seller, or some combination. The businesses operator might likely charge Bob for assisting in preparing his idea for the site. Fees might include, but not be limited to copyrighting assistance, drawings, or the formation of the staging of information for controlled release to potential buyers. The site would obviously charge in some way to recoup its investment from expenses relating to hosting the listing, and advertising to both sellers and buyers to visit. There would certainly be legal services that might be required by either or both parties. Whether IGF were to offer those services in some way or simple reference them out, they have trade value. In the event the site creates considerable traffic, other sorts of services, those specifically relate to the profile of visitors to the site, could be offered. Revenues from advertising on the site would be possible. And last, but not least, in the event that either of the parties were to ask for a "human" agent to be involved, fees for services could be realized there as well.

Although the preferred embodiment is demonstrated using IP of an invention nature, the same concept would hold true for other sorts of IP that involve buyers and sellers. For instance, copyrighted materials such as manuscripts for books might be offered for sale in a similar way. Maybe original works of music the same.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for facilitating a transaction between two or more parties comprising the steps of:
   receiving registration information at a server computer via a network from a client communications device of each party to the transaction wherein (a) the client communications device comprises a computer, a workstation, a personal data assistant, a web-enabled phone or a wireless communications device, and (b) the registration information comprises a user name for the party, a password for the party and an electronic signature for the party and begins the transaction;
   assigning a secured account for the transaction on the server computer that is accessible via the network;
   providing each party with login information for the secured account;
   receiving one or more electronic documents at the server computer from the client communications device of one of the parties;
   posting the received electronic documents to the secured account on the server computer such that the client communications device of each party can retrieve and modify the posted electronic documents via the network;
   tracking one or more changes to the posted electronic documents made by the client communications devices of the parties; and
   whenever an acceptance of all portions of one of the posted electronic documents is received by the server computer from the client communications devices of all the parties, locking the posted electronic document on the server computer against future changes, attaching the electronic signature from each agreed party to the agreed to and locked electronic document and providing the signed electronic documents to each party.

2. The method as recited in claim 1, wherein:
   the transaction involves intellectual property, goods or services;
   the intellectual property comprises copyrightable material, ideas, patents, patent applications, trademarks, licenses or technology;
   the one or more electronic documents are selected by the party from a list of standard agreements made available to the party;
   the one or more electronic documents are stored in a user profile assigned to the party; or
      one or more portions of the received documents are locked against future changes.

3. The method as recited in claim 1, further comprising the step of providing a dialog session that is: (a) public to all the parties for recording comments relating to the one or more electronic documents, or (b) private between at least two of the parties for recording comments to the one or more electronic documents.

4. The method as recited in claim 1, wherein the step of tracking one or more changes to the electronic documents made by the parties comprises:
   receiving one or more commands relating to a portion of the electronic documents from the parties, wherein the one or more commands include an acceptance of the portion of the electronic documents, a rejection of the portion of the electronic documents, a modification of the portion of the electronic documents, or a substitution of the portion of the electronic documents; and
   displaying the acceptances, the rejections, the modifications and the substitutions in a different visual format.

5. A non-transitory computer readable medium encoded with a computer program for facilitating a transaction between two or more parties comprising:
   a code segment for receiving registration information at a server computer via a network from a client communications device of each party to the transaction wherein (a) the client communications device comprises a computer, a workstation, a personal data assistant, a web-enabled phone or a wireless communications device, and (b) the registration information comprises a user name for the party, a password for the party and an electronic signature for the party and begins the transaction;
   a code segment for assigning a secured account for the transaction on the server computer that is accessible via the network;
   a code segment for providing each party with login information for the secured account;
   a code segment for receiving one or more electronic documents at the server computer from the client communications device one of the parties;

a code segment for posting the received electronic documents to the secured account on the server computer such that the client communications device of each party can retrieve and modify the posted electronic documents via the network;

a code segment for tracking one or more changes to the posted electronic documents made by the client communications devices of the parties; and a code segment for whenever an acceptance of all portions of one of the posted electronic documents is received by the server computer from the client communications devices of all the parties, locking the posted electronic document on the server computer against future changes, attaching the electronic signature from each agreed party to the agreed to and locked electronic document and providing the signed electronic document to each agreed party.

6. The non-transitory computer readable medium as recited in claim 5, wherein:

the transaction involves intellectual property, goods or services;

the intellectual property comprises copyrightable material, ideas, patents, patent applications, trademarks, licenses or technology;

the one or more electronic documents are selected by the party from a list of standard agreements made available to the party;

the one or more electronic documents are stored in a user profile assigned to the party; or one or more portions of the received documents are locked against future changes.

7. The non-transitory computer readable medium as recited in claim 5, further comprising a code segment for providing a dialog session that is: (a) public to all the parties for recording comments relating to the one or more electronic documents, or (b) private between at least two of the parties for recording comments to the one or more electronic documents.

8. The non-transitory computer readable medium as recited in claim 5, wherein the code segment for tracking one or more changes to the electronic documents made by the parties comprises:

a code segment for receiving one or more commands relating to a portion of the electronic documents from the parties, wherein the one or more commands include an acceptance of the portion of the electronic documents, a rejection of the portion of the electronic documents, a modification of the portion of the electronic documents, or a substitution of the portion of the electronic documents; and a code segment for displaying the acceptances, the rejections, the modifications and the substitutions in a different visual format.

9. A system for facilitating a transaction between two or more parties comprising:

a network interface;

one or more data storage devices;

one or more processors communicably coupled to the network interface and the data storage devices; and a non-transitory computer readable medium encoded with a computer program communicably coupled to the processors to (a) receive registration information via the network interface from a client communications device of each party to the transaction wherein (i) the client communications device comprises a computer, a workstation, a personal data assistant, a web-enabled phone or a wireless communications device, and (ii) the registration information comprises a user name for the party, a password for the party and an electronic signature for the party and begins the transaction, (b) assign a secured account for the transaction that is accessible via the network interface, (c) provide each party with login information for the secured account, (d) receive one or more electronic documents via the network interface from the client communications device of one of the parties, (e) post the received electronic documents to the secured account such that the client communications device of each party can retrieve and modify the posted electronic documents via the network interface, (f) track one or more changes to the posted electronic documents made by the client communications devices of the parties, and (g) whenever an acceptance of all portions of one of the posted electronic documents is received from the client communications devices of all the parties via the network interface, lock the posted electronic document on the server computer against future changes, attach the electronic signature from each agreed party to the agreed to and locked electronic document, and provide the signed electronic documents to each party.

10. The system as recited in claim 9, wherein:

the transaction involves intellectual property, goods or services;

the intellectual property comprises copyrightable material, ideas, patents, patent applications, trademarks, licenses or technology;

the one or more electronic documents are selected by the party from a list of standard agreements made available to the party;

the one or more electronic documents are stored in a user profile assigned to the party; or one or more portions of the received documents are locked against future changes.

11. The system as recited in claim 9, wherein the processor further provides a dialog session that is: (a) public to all the parties for recording comments relating to the one or more electronic documents, or (b) private between at least two of the parties for recording comments to the one or more electronic documents.

12. The system as recited in claim 9, wherein the step of tracking one or more changes to the electronic documents made by the parties comprises:

receiving one or more commands relating to a portion of the electronic documents from the parties, wherein the one or more commands include an acceptance of the portion of the electronic documents, a rejection of the portion of the electronic documents, a modification of the portion of the electronic documents, or a substitution of the portion of the electronic documents; and displaying the acceptances, the rejections, the modifications and the substitutions in a different visual format.

13. A method for facilitating a proposed transaction involving an intellectual property between an originating party and a potential buying party comprising the steps of:

receiving acceptance of one or more terms and conditions associated with posting the proposed transaction from an origination party;

receiving a unrestricted description of the intellectual property from the originating party, wherein the intellectual property comprises copyrightable material, ideas, patents, patent applications, trademarks, licenses or technology;

receiving one or more restricted descriptions of the intellectual property and one or more conditions of release for each of the restricted descriptions of the intellectual property from the originating party;

receiving one or more selected operating preferences relating to the disclosure of the one or more restricted descriptions of the intellectual property from the originating party;

posting the unrestricted description of the intellectual property on a web site; and automatically negotiating the disclosure of the one or more restricted descriptions of the intellectual property whenever a request for the one or more conditions of release for at least one of the restricted descriptions of the intellectual property is received at a server computer via a network from a client communications device of the potential buying party, wherein the client communications device comprises a computer, a workstation, a personal data assistant, a web-enabled phone or a wireless communications device, comprising the steps of:

providing the client communications device of the potential buying party with the requested one or more conditions of release associated with the restricted description(s) of the intellectual property and any relevant operating preferences of the originating party relating to the requested one or more conditions of release via the network, providing the requested restricted description(s) to the client communications device of the potential buying party via the network whenever the potential buying party agrees electronically to the one or more conditions of release for the requested restricted description(s), receiving one or more conditions of acceptance for the requested restricted description(s) at the server computer via the network whenever the client communications device of the potential buying party requires the originating party to accept the one or more conditions of acceptance prior to disclosure of the requested restricted description(s), and electronically tracking the restricted descriptions provided to the client communications device of the potential buying party and the conditions agreed to by the potential buying party and the conditions agreed to by the originating party, if any.

14. The method as recited in claim 13, wherein each restricted description provides additional detail about the intellectual property that is commensurate with the one or more conditions of release for the restricted description.

15. The method as recited in claim 13, wherein:
the transaction involves the sale of goods or services associated with the intellectual property;
the one or more terms and conditions create a legally binding electronic signature for the originating party;
the restricted description includes graphical content, audio content or a combination thereof;
one or more conditions of release includes the potential buying party's agreement to a confidentiality agreement comprising a standard agreement accessible on the web site or supplied by the originating party;
the one or more selected operating preferences includes an automatic notification function; or
the one or more conditions of acceptance includes the originating party's agreement to a waiver.

16. The method as recited in claim 13, further comprising the steps of:
searching the restricted disclosure(s) for one or more search terms provided by the potential buying party without agreeing to the one or more conditions of release; and providing the potential buying party with any unrestricted descriptions that correspond to any restricted disclosure that contains the one or more search terms.

17. A non transitory computer readable medium encoded with a computer program facilitating a proposed transaction involving intellectual property between an originating party and a potential buying party comprising:

a code segment for receiving acceptance of one or more terms and conditions associated with posting the proposed transaction from an origination party;

a code segment for receiving a unrestricted description of the intellectual property from the originating party, wherein the intellectual property comprises copyrightable material, ideas, patents, patent applications, trademarks, licenses or technology;

a code segment for receiving one or more restricted descriptions of the intellectual property and one or more conditions of release for each of the restricted descriptions of the intellectual property from the originating party;

a code segment for receiving one or more selected operating preferences relating to the disclosure of the one or more restricted descriptions of the intellectual property from the originating party;

a code segment for posting the unrestricted description of the intellectual property on a web site; and a code segment for automatically negotiating the disclosure of the one or more restricted descriptions of the intellectual property whenever a request for the one or more conditions of release for at least one of the restricted descriptions of the intellectual property is received at a server computer via a network from a client communications device of the potential buying party, wherein the client communications device comprises a computer, a workstation, a personal data assistant, a web-enabled phone or a wireless communications device, comprising the steps of:

providing the client communications device of the potential buying party with the requested one or more conditions of release associated with the restricted description(s) of the intellectual property and any relevant operating preferences of the originating party relating to the requested one or more conditions of release via the network, providing the requested restricted description(s) to the client communications device of the potential buying party via the network whenever the potential buying party agrees electronically to the one or more conditions of release for the requested restricted description(s), receiving one or more conditions of acceptance for the requested restricted description(s) at the server computer via the network whenever the client communications device of the potential buying party requires the originating party to accept the one or more conditions of acceptance prior to disclosure of the requested restricted description(s), and electronically tracking the restricted descriptions provided to the client communications device of potential buying party and the conditions agreed to by the potential buying party and the conditions agreed to by the originating party, if any.

18. The computer program as recited in claim 17, wherein each restricted description provides additional detail about the intellectual property that is commensurate with the one or more conditions of release for the restricted description.

19. The computer program as recited in claim 17, wherein:
the transaction involves the sale of goods or services associated with the intellectual property;
the one or more terms and conditions create a legally binding electronic signature for the originating party;
the restricted description includes graphical content, audio content or a combination thereof;
one or more conditions of release includes the potential buying party's agreement to a confidentiality agreement comprising a standard agreement accessible on the web site or supplied by the originating party;
the one or more selected operating preferences includes an automatic notification function; or
the one or more conditions of acceptance includes the originating party's agreement to a waiver.

20. The computer program as recited in claim 17, further comprising:
a code segment for searching the restricted disclosure(s) for one or more search terms provided by the potential buying party without agreeing to the one or more conditions of release; and
a code segment for providing the potential buying party with any unrestricted descriptions that correspond to any restricted disclosure that contains the one or more search terms.

21. A system for facilitating a proposed transaction involving an intellectual property between an originating party and a potential buying party comprising:
a network interface;
one or more data storage devices;
one or more processors communicably coupled to the network interface and the data storage devices; and
a non-transitory computer readable medium encoded with a computer program communicably coupled to the processors to (a) receive acceptance of one or more terms and conditions associated with posting the proposed transaction from an origination party, (b) receive a unrestricted description of the intellectual property from the originating party, wherein the intellectual property comprises copyrightable material, ideas, patents, patent applications, trademarks, licenses or technology, (c) receive one or more restricted descriptions of the intellectual property and one or more conditions of release for each of the restricted descriptions of the intellectual property from the originating party, (d) receive one or more selected operating preferences relating to the disclosure of the one or more restricted descriptions of the intellectual property from the originating party, (e) post the unrestricted description of the intellectual property on a web site, and (f) automatically negotiating the disclosure of the one or more restricted descriptions of the intellectual property whenever a request for the one or more conditions of release for at least one of the restricted descriptions of the intellectual property is received via the network interface from a client communications device of the potential buying party, wherein the client communications device comprises a computer, a workstation, a personal data assistant, a web-enabled phone or a wireless communications device, comprising the steps of: providing the client communications device of the potential buying party with the requested one or more conditions of release associated with the restricted description(s) of the intellectual property and any relevant operating preferences of the originating party relating to the requested one or more conditions of release via the network interface, providing the requested restricted description(s) to the client communications device of the potential buying party via the network interface whenever the potential buying party agrees electronically to the one or more conditions of release for the requested restricted description(s), receiving one or more conditions of acceptance for the requested restricted description(s) via the network interface whenever the client communications device of the potential buying party requires the originating party to accept the one or more conditions of acceptance prior to disclosure of the requested restricted description(s), and electronically tracking the restricted descriptions provided to the client communications device of the potential buying party and the conditions agreed to by the potential buying party and the conditions agreed to by the originating party, if any.

22. The system as recited in claim 21, wherein each restricted description provides additional detail about the intellectual property that is commensurate with the one or more conditions of release for the restricted description.

23. The system as recited in claim 21, wherein:
the transaction involves the sale of goods or services associated with the intellectual property;
the one or more terms and conditions create a legally binding electronic signature for the originating party;
the restricted description includes graphical content, audio content or a combination thereof;
one or more conditions of release includes the potential buying party's agreement to a confidentiality agreement comprising a standard agreement accessible on the web site or supplied by the originating party;
the one or more selected operating preferences includes an automatic notification function; or
the one or more conditions of acceptance includes the originating party's agreement to a waiver.

24. The system as recited in claim 21, further comprising:
the computer program searches the restricted disclosure(s) for one or more search terms provided by the potential buying party without agreeing to the one or more conditions of release; and
the computer program provides the potential buying party with any unrestricted descriptions that correspond to any restricted disclosure that contains the one or more search terms.

* * * * *